United States Patent

[11] 3,578,937

[72] Inventor: Kurt H. Sennowitz
  Royal Oak, Mich.
[21] Appl. No.: 852,023
[22] Filed: Aug. 21, 1969
[45] Patented: May 18, 1971
[73] Assignee: Elox Inc.
  Troy, Mich.

[54] ELECTRICAL DISCHARGE MACHINING POWER SUPPLY CIRCUIT OF THE SUPERIMPOSED VOLTAGE TYPE
11 Claims, 1 Drawing Fig.

[52] U.S. Cl. .................................... 219/69,
 219/135
[51] Int. Cl. .................................... B23p 1/08

[50] Field of Search .......................... 219/69 (C),
 69 (F), 69 (P), 131, 135

[56] References Cited
UNITED STATES PATENTS
3,231,782  1/1966  Ferguson .................. 219/69(C)X
3,328,635  6/1967  Webb ........................ 219/69(P)X Primary Examiner—R. F. Staubly
Attorney—Radford W. Luther ABSTRACT: A circuit for providing EDM machining pulses from a pair of different magnitude voltage sources. A pair of electronic switches such as transistors are employed to pulse the sources, either separately or additively to control the magnitude of the machining pulses applied and thereby control the mode of machining from roughing to finishing.

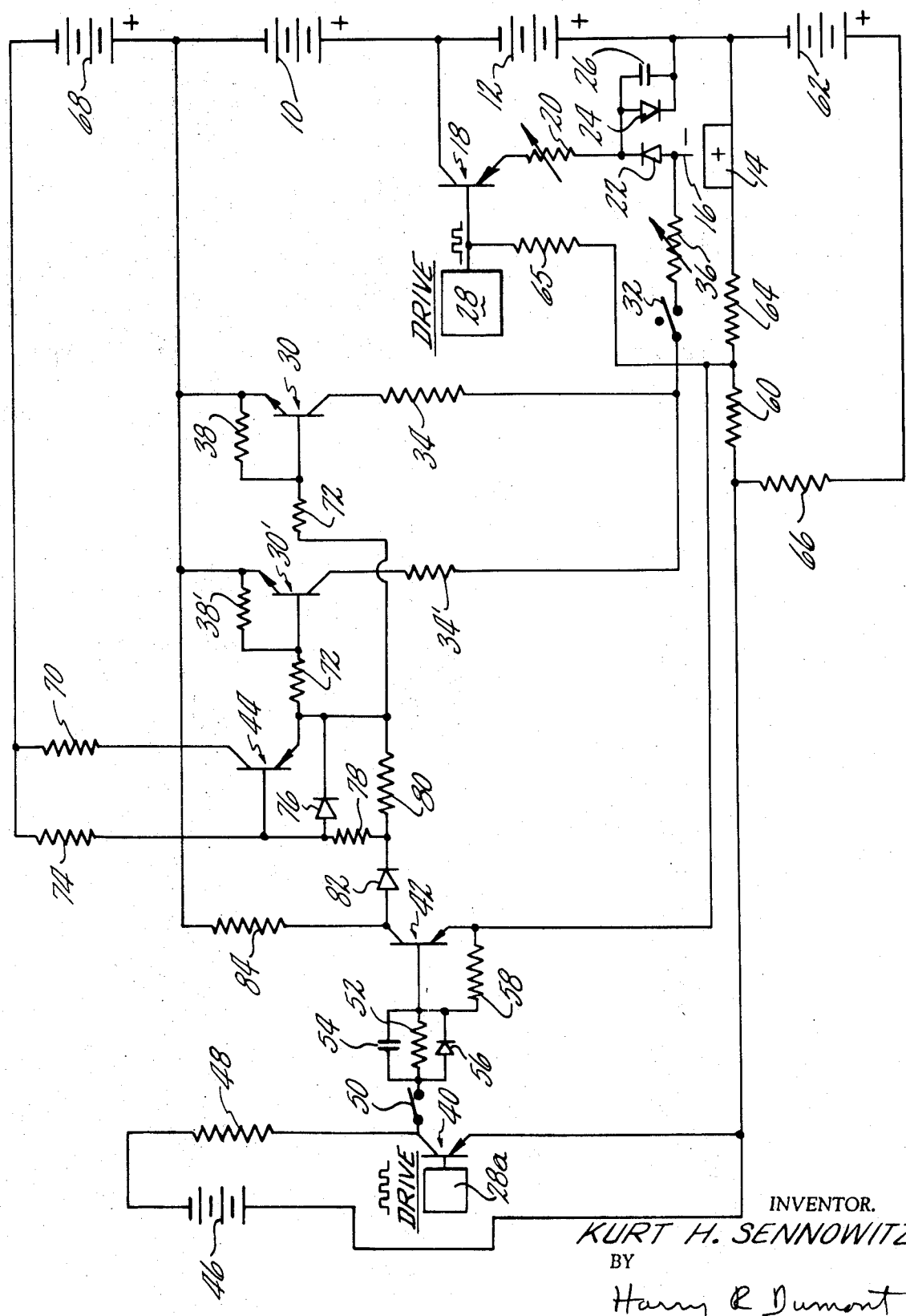
INVENTOR.
KURT H. SENNOWITZ
BY
Harry R Dumont
ATTORNEY

ELECTRICAL DISCHARGE MACHINING POWER SUPPLY CIRCUIT OF THE SUPERIMPOSED VOLTAGE TYPE

BACKGROUND OF THE INVENTION

The field to which my invention relates is that known as electrical discharge machining in which material is removed from an electrically conductive workpiece by the action of electrical gap discharges between a tool electrode and the workpiece. An electrode or workpiece servo feed system is used to maintain an optimum gap spacing between electrode and workpiece as metal removal progresses. A dielectric coolant is circulated continuously through the gap during machining operation.

I have found that a high striking voltage pulse imposed on the normal machining power pulse is very desirable for deep hole cutting, particularly for holes substantially greater than 1 inch in depth. The use of such superimposed voltage permits more stable cutting by permitting machining with a wider gap spacing, thus permitting the sludge and eroded particles entrained with the coolant to pass more rapidly and in greater quantity through the gap. This effectively aids in preventing gap short circuit condition with attendant damage to either or both the gap elements. My novel circuit for employing superimposed voltage pulses permits ready changeover back and forth between roughing operation and fine finish operation as well.

SUMMARY OF THE INVENTION

My invention provides for the use of a pair of series connected voltage sources which are controlled in gap switching through two separate transistors or banks of transistors. The sources are connected additively across the gap through the operation of a relatively high voltage transistor for finishing operation. One of the sources is connected to the gap through the operation of one or more relatively low voltage high current transistors for roughing operation. For deep hole or cavity cutting as I have above indicated, both transistors are simultaneously pulsed to their conductive state.

DESCRIPTION OF THE CIRCUIT

Referring now to the drawing, the power supply circuit includes a pair of machining voltage sources. DC supply 10 is a relatively high voltage, low current source. DC supply 12 is a relatively low voltage, high current source. The two sources are series connected with the lower, positive terminal of supply 12 connected to workpiece 14. Tool electrode 16 is shown separated from workpiece 14 by a machining gap which gap is normally filled with dielectric coolant during machining. A power feed means, not shown, is also employed to advance the electrode 16 toward workpiece 14 as machining progresses.

The low voltage machining power pulses are produced through the operation of output stage transistor 18 which is a PNP transistor having its collector connected to the negative terminal of supply 12. A variable gap current limiting resistor 20 and a diode 22 are connected in series between the emitter of transistor 18 and tool electrode 16. It is the function of diode 22 to protect low voltage rated transistor 18 from high voltage spikes during high voltage operation of the circuit. It thus serves to block any voltage higher than the transistor 18 voltage supply 12. The parallel combination of rectifier 24 and capacitor 26 is used to clamp the emitter of transistor 18 to zero level to protect it against high voltage spikes.

The means for pulsing transistor 18 on and off to provide machining pulses across the gap is shown in block form as drive voltage source 28. One example of a complete system for providing drive voltage pulses to an output transistor EDM stage is shown in FIG. 1 of my U.S. Pat. No. 3,439,145 issued on Apr. 15, 1969 and entitled "Electrical Discharge Machining Power Supply Circuit."

A second transistor output stage for high voltage operation comprises a pair of NPN tar transistors 30, 30' which are of the high voltage operating type. These transistors are shown with their respective power conducting electrodes, emitter and collector, operatively connected between the negative terminal of DC source 10 and electrode 16. A plurality of transistors may be paralleled after the manner of transistors 30, 30' according to the current level desired for the high voltage operation. In the closed position of switch 32, the collectors of transistors 30, 30' are connected through resistors 34, 34' and gap current limiting resistor 36 to the negative polarity gap element, namely, tool electrode 16. Resistors 38, 38' are connected to protect the base to emitter junction of their respective transistors from excess turnoff voltage.

The triggering pulses to turn transistors 30, 30' on and off are provided by the operation of drive voltage source 28a, transistors 40, 42, 44 and their associated stages. Drive voltage sources 28a, 28 may be the same source or separate sources operated in unison. Transistor 40 is connected across DC source 46 through resistor 48. In the closed position of switch 50, transistor 42 is turned on through source 46 and resistors 48, 52 while transistor 40 is in its off stage. Coupling capacitor 54 and diode 56 are connected as shown. Resistor 58 protects the base to emitter junction of transistor 42 from excess turnoff voltage. During the conduction of transistor 40, diode 56 insures the turnoff of transistor 42 by the bias voltage provided across resistor 60. Bias voltage for the several stages is provided by source 62 and the several divider resistors 60, 64, 65, and 66. The function of capacitor 54 is to aid in the leading edge turn-on of transistor 42.

Transistor 44 will be turned on during the nonconducting state of transistor 42 to apply negative bias source 68 through collector limiting resistor 70, the collector and emitter of transistor 44, resistors 72', 72 and resistors 38', 38 across the respective base-emitter junctions of transistors 30', 30 to turn them off. Turn-on current for transistor 44 is taken from bias source 68 through resistor 74 for a minus base to emitter signal. Diode 76 limits the base to emitter voltage drop during the nonconducting state of transistor 44. Resistor 78 has a predetermined value to render the base of transistor 44 and the plate of rectifier 76 more positive than the emitter of transistor 44 to bias it off during the conductive state of transistor 42. Resistor 80 serves to limit the turn-on drive current for output transistors 30, 30'. Diode 82 decouples the transistor 42 collector junction in its nonconducting state. Resistor 84 is in series with the collector of transistor 42 to improve its switching speed.

DESCRIPTION OF OPERATION

The circuit operation will now be described with respect to the three operating modes possible.

NORMAL MACHINING OPERATION

In this mode, transistor 18 is pulsed on and off at variable duty cycle as described in my aforementioned U.S. Pat. No. 3,439,145. Transistor 18 is of the relatively high current, low voltage type while source 12 is of a relatively low voltage magnitude, for example, of the order of 70 volts. When transistor 18 is turned on by the pulse output of drive voltage source 28, if the proper gap spacing and condition exists, sparkover will occur across the gap and material removal will occur. This mode of operation is particularly suitable for roughing operation at maximum metal removal rate. Switches 50 and 32 are opened to decouple the high voltage portion of the circuit from the gap.

SUPERIMPOSED HIGH VOLTAGE OPERATION

In this mode of operation, the low voltage output stage comprising transistor 18 and the high voltage output stage comprising transistors 30, 30' are both turned on and off in unison through the operation of drive voltage sources 28, 28a. In the off stage of transistor 40, drive transistor 42 is turned on by negative bias source 46 through limiting resistors 48 and 52. Transistor 42 during its conductive state applies a positive current through rectifier 82, resistors 80, 72' and 72, to the respective bases of transistors 30' and 30 to turn them on and provide a high voltage pulse across the gap. Transistor 44 will turn on during the nonconducting state of transistor 42 and apply the negative bias source 58 across the base-emitter junction of transistors 30, 30' to turn them off. This mode of operation imposes a high voltage, low current pulse on a low voltage, high current pulse of the same time duration in a manner to greatly improve deep hole cutting as previously described. Switches 50 and 32 are in a closed position during the superimposed voltage operation.

HIGH VOLTAGE FINISHING OPERATION

In this mode of operation, the output of drive voltage source 28 to the base of transistor 18 is interrupted by a suitable switching means. However, the pulse output from drive pulse source 28a is provided to transistor 40 to control its conduction and turn high voltage transistors 30, 30' on and off as set forth in the section above. Switches 50 and 32 are in their closed position. With transistor 18 left in its unoperated condition, transistors 30, 30' operate to switch the series combination of DC sources 10, 12 to provide machining pulses having their combined voltage magnitudes across the gap. This high voltage operation even at very low currents greatly facilitates fine finish operation. Use of the high voltage circuit will enable machining at a cutting gap of from two to three times the normal gap cutting voltage.

It will thus be seen that by my invention I have provided a novel EDM power supply circuit capable of operating in three separate and distinct modes, each having its respective advantages and benefits. My circuit is further capable of readily switching between the several modes with a minimum of adjustment and economy of apparatus. Provision of a higher voltage, long power pulse promotes a better turnoff at the end of each pulse because of a higher inductive spike produced. This type of circuit according to the present invention assures a stable potential difference between the open arc and cutting arc condition which results in a relatively constant value discharge current at each gap breakdown.

I claim:

1. In an electrical discharge machining circuit for machining a conductive workpiece by intermittent electrical discharges across a pair of gap elements comprising a tool electrode and the workpiece separated by a dielectric coolant filled gap, a pair of series connected, additive sources of machining power, one of said sources of relatively high voltage, low current and the other of said sources of relatively low voltage, high current, one end terminal of said combined sources coupled to one of said gap elements, wherein the improvement comprises a first electronic switch having a control electrode and a pair of power electrodes, said power electrodes connected across a common terminal of said sources and the other of said gap elements, a second electronic switch having a control electrode and a pair of power electrodes, said power electrodes connected across said other of said gap elements and the other end terminal of said combined sources, and means for pulsing said control electrodes of said switches in unison to provide superimposed high voltage pulses of like time duration to said gap for deep hole machining operations.

2. In an electrical discharge machining circuit for machining a conductive workpiece by intermittent electrical discharges across a pair of gap elements comprising a tool electrode and the workpiece separated by a dielectric coolant filled gap, a pair of series connected additive sources of machining power, one of said sources of relatively high voltage, low current and the other of said sources of relatively low voltage, high current, one end terminal of said combined sources coupled to one of said gap elements, wherein the improvement comprises a first electronic switch having a control electrode and a pair of power electrodes, said power electrodes connected across a common terminal of said sources and the other of said gap elements, a second electronic switch having a control electrode and a pair of power electrodes, said power electrodes connected across said other of said gap elements and the other end terminal of said combined sources, a drive voltage source for pulsing said control electrodes of both said switches to provide superimposed, like time duration pulses for high voltage machining, and switching means connected in series with one of said power electrodes of said second electronic switch for uncoupling it to provide relatively low voltage pulses to said gap for normal machining operation.

3. In an electrical discharge machining circuit for machining a conductive workpiece by intermittent electrical discharges across a pair of gap elements comprising a tool electrode and the workpiece separated by a dielectric coolant filled gap, a pair of series connected sources of machining power, one of said sources of relatively high voltage, low current and the other of said sources of relatively low voltage, high current, one end terminal of said combined sources coupled to one of said gap elements, wherein the improvement comprises a first electronic switch having a control electrode and a pair of power electrodes, said power electrodes connected across a common terminal of said sources and the other of said gap elements, a second electronic switch having a control electrode and a pair of power electrodes, said power electrodes connected across said other of said gap elements and the other end terminal of said combined sources, means for pulsing said control electrodes of both said switches to provide high voltage, finish machining, and switching means operatively connected to and controlling the control electrode of said second switching means for decoupling it from said pulsing means whereby relatively low voltage pulses are passed to said gap for normal machining operation.

4. In an electrical discharge machining circuit for machining a conductive workpiece by intermittent electrical discharges across a pair of gap elements comprising a tool electrode and the workpiece separated by a dielectric coolant filled gap, wherein the improvement comprises a pair of series connected, additive DC sources of machining power, a first electronic switch having a control electrode and having a pair of power electrodes connected across the serial connection of one of said sources and said gap, a second electronic switch having a control electrode and a pair of power electrodes, said power electrodes operatively connected across the serial combination of both said sources and said gap, and a drive voltage source connected to the control electrodes of both said switches to turn them on and off in phase to provide superimposed voltage pulses of like time duration to said gap.

5. The combination as set forth in claim 4 wherein said first mentioned switch is of relatively high current, low voltage capability and said second mentioned switch is of relatively low current, high voltage capability.

6. The combination as set forth in claim 5 wherein said first mentioned source is of relatively low voltage, high current magnitude and wherein said second mentioned source is of relatively high voltage, low current magnitude.

7. The combination as set forth in claim 6 wherein a switching means is operatively connected between said second source and said gap, said switching means operable in its closed position to provide superimposed high voltage machining and operable in its open position to provide normal voltage level machining.

8. The combination as set forth in claim 4 wherein a blocking rectifier is connected in series between said first source and said gap for protecting said first switch from the higher voltage of said combined sources during high voltage cutting.

9. In an electrical discharge machining circuit for machining a conductive workpiece by intermittent electrical discharges across a pair of gap elements comprising a tool electrode and the workpiece separated by a dielectric coolant filled gap, a pair of series-connected, additive DC sources of machining power, one terminal of said combined sources coupled to one of said gap elements, wherein the improvement comprises a first electronic switch having a control electrode and a pair of power electrodes, said power electrodes connected across a common terminal of said sources and the other of said gap elements, a second electronic switch having a control electrode and a pair of electrodes, said power electrodes connected across said other of said gap elements and the other end terminal of said combined sources, means for pulsing said control electrodes of said switches in unison to provide superimposed high voltage pulses of like time duration to said gap for deep hole machining operation, a first normally closed switching means connected in series between one of said power electrodes of said second electronic switch and said gap, and a second normally closed switching means connected in series between the control electrode of said first electronic switch and said pulsing means, said first switching means operable in its open position to provide relatively low voltage machining pulses across said gap and said second switching means operable in its open position to provide relatively high voltage machining pulses across said gap.

10. The combination as set forth in claim 9 wherein a blocking rectifier is connected in series between one of said power electrodes of said first switch and said gap for protecting said first switch from the higher voltage of said combined sources during high voltage cutting and wherein a second blocking rectifier is connected in series between the terminal of said sources connected to said gap element and said power electrode of said first switch for protecting it from high voltage transients across said gap.

11. The combination as set forth in claim 9 wherein a third normally closed switching means is operatively connected between said pulsing means and said control electrode of said second electronic switch for interrupting drive pulses thereto, said first and third switching means conjointly operable to an open position during low voltage operation of the electrical discharge machining circuit.

PO-1050
(5/69)

UNITED STATES PATENT OFFICE
CERTIFICATE OF CORRECTION

Patent No. 3,578,937      Dated May 18, 1971

Inventor(s) Kurt H. Sennowitz

It is certified that error appears in the above-identified patent and that said Letters Patent are hereby corrected as shown below:

IN THE SPECIFICATION:

Column 3, line 5, change "58" to read -- 68 --

IN THE CLAIMS:

Claim 9 - Column 5, line 4, insert the word "power" before "electrodes" first appearance.

Signed and sealed this 24th day of August 1971.

(SEAL)
Attest:

EDWARD M. FLETCHER, JR.
Attesting Officer

WILLIAM E. SCHUYLER, JR.
Commissioner of Patents